United States Patent
Fareed et al.

(10) Patent No.: US 10,291,362 B2
(45) Date of Patent: May 14, 2019

(54) ENHANCED PERFORMANCE HYBRID-ARQ

(71) Applicant: KING ABDULLAH UNIVERSITY OF SCIENCE AND TECHNOLOGY, Thuwal (SA)

(72) Inventors: Muhammad Mehboob Fareed, Waterloo (CA); Hong-Chuan Yang, Victoria (CA); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 56 days.

(21) Appl. No.: 15/533,730

(22) PCT Filed: Dec. 4, 2015

(86) PCT No.: PCT/IB2015/059380
§ 371 (c)(1),
(2) Date: Jun. 7, 2017

(87) PCT Pub. No.: WO2016/092443
PCT Pub. Date: Jun. 16, 2016

(65) Prior Publication Data
US 2017/0366304 A1 Dec. 21, 2017

Related U.S. Application Data

(60) Provisional application No. 62/088,870, filed on Dec. 8, 2014.

(51) Int. Cl.
*H04L 1/18* (2006.01)
*H04L 1/00* (2006.01)
*H04W 88/02* (2009.01)

(52) U.S. Cl.
CPC .......... *H04L 1/1812* (2013.01); *H04L 1/0054* (2013.01); *H04L 1/1893* (2013.01); *H04L 1/1896* (2013.01); *H04W 88/02* (2013.01)

(58) Field of Classification Search
CPC ... H04L 1/0054; H04L 1/1812; H04L 1/1887; H04L 1/1893; H04L 1/1896
See application file for complete search history.

(56) References Cited

U.S. PATENT DOCUMENTS

| 8,964,688 B2* | 2/2015 | Kim | H04L 1/1896 370/330 |
| 2004/0199846 A1 | 10/2004 | Matsumoto et al. | |

(Continued)

OTHER PUBLICATIONS

Liang et al., Sequential Linear MIMO precoder optimization for hybrid ARQ retransmission of QAM signals, Sep. 2011, IEEE Comm. letters, vol. 15, No. 9, pp. 913 to 915.*

(Continued)

*Primary Examiner* — Shelly A Chase
(74) *Attorney, Agent, or Firm* — Patent Portfolio Builders PLLC

(57) ABSTRACT

Apparatuses, computer readable media, and methods are provided for enhancing hybrid automatic repeat request (ARQ) performance. In an example method, a communication device transmits a first element of a vector, where the vector is selected using the information bits to be transmitted as an index in a code book. In some embodiments, this code book is constructed using Linear Constellation Precoding (LCP). If a NACK is received, the communication device transmits a second element of the vector. The process of transmitting elements of the vector continues until an ACK is received or the maximum number of transmission attempts is reached. If an ACK is received, the communication device transmits a first element of another vector of the code book that encodes a second set of information bits.

(Continued)

This procedure may continue until all information bits have been transmitted successfully.

20 Claims, 9 Drawing Sheets

(56) References Cited

U.S. PATENT DOCUMENTS

| | | | |
|---|---|---|---|
| 2006/0039299 A1 | 2/2006 | Ihm et al. | |
| 2007/0168826 A1* | 7/2007 | Terry | H04L 1/1812 714/748 |
| 2007/0243903 A1 | 10/2007 | Ihm et al. | |
| 2009/0080579 A1 | 3/2009 | Fujii | |
| 2009/0102715 A1 | 4/2009 | Lou et al. | |
| 2010/0097987 A1* | 4/2010 | Chun | H04L 1/1887 370/328 |
| 2012/0045021 A1 | 2/2012 | Zhao et al. | |
| 2012/0140846 A1 | 6/2012 | Golitschek et al. | |
| 2014/0362812 A1* | 12/2014 | Ko | H04B 7/0623 370/329 |

OTHER PUBLICATIONS

International Search Report and Written Opinion for Application No. PCT/IB2015/059380 dated Feb. 25, 2016.
Kan, Z. et al., *Design and Performance of Space-Time Precoder With Hybrid ARQ Transmission*, IEEE Transactions on Vehicular Technology, vol. 58, No. 4 (dated May 1, 2009) 1816-1822.
Wengerter et al., *Advanced Hybrid ARQ Technique Employing a Signal Constellation Rearrangement*, Proc. Of IEEE 56$^{th}$ Vehicular Technology Conference (VTC 2002-Fall) (dated Sep. 2002) pp. 2002-2006.
*Enhanced HARQ Method With Signal Constellation Rearrangement*, Panasonic, TSG-RAN Working Group 1 Meeting (dated Feb. 2001) 11 pages.

* cited by examiner

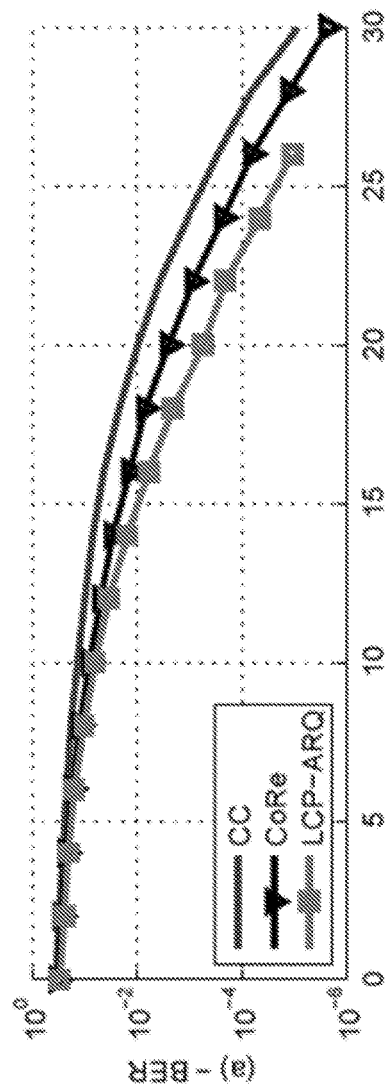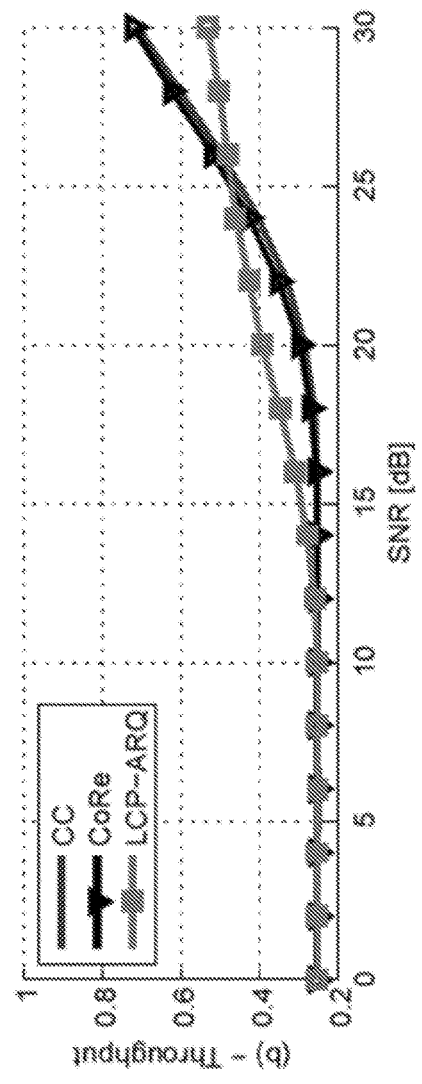
FIG. 6A
FIG. 6B

ENHANCED PERFORMANCE HYBRID-ARQ

CROSS-REFERENCE TO RELATED APPLICATIONS

The application is a national stage entry of PCT patent application PCT/IB2015/059380, filed Dec. 4, 2015, which claims the benefit of U.S. Provisional Patent Application No. 62/088,870, filed Dec. 8, 2014. The entire contents of both of these applications are incorporated herein by reference.

TECHNOLOGICAL FIELD

Example embodiments of the present invention relate generally to the transmission of data over wired or wireless channels and, more particularly, to an improved hybrid-ARQ scheme.

BACKGROUND

Transmissions of data over both wired channels and wireless channels are susceptible to error, as every communication channel carries some amount of noise that can corrupt the transmitted signal. Because data transmission has become a foundation for many technologies relied upon by modern society, the problems caused by communication channel noise are significant and increasingly important. Historically, to address errors in a packet transmission, error detecting (ED) codes such as a cyclic redundancy check (CRC) have been used by a signal receiver to detect whether there is an error in the packet. If an error is detected, the receiver can request retransmission of the packet to ensure that the transmission is received in full.

Based on this concept of retransmission, automatic repeat request (ARQ) schemes utilize positive acknowledgment (ACK) and negative acknowledgment (NACK) feedback from the receiver to improve link reliability. Traditionally, data packets are repeatedly transmitted until either the packet is decoded successfully or the predefined maximum number of repetitions is exceeded. A basic ARQ scheme often performs very poorly, however, because retransmissions are susceptible to the same communication channel noise that causes initial transmission errors, so throughput deteriorates as channel noise increases.

Accordingly, hybrid-ARQ (or HARQ) schemes have been developed that combine conventional ARQ with forward error correction (FEC) to further improve performance of the transmission. In Type I hybrid-ARQ, FEC bits, in addition to the ED bits, are transmitted with the information bits, and provide the receiver with the ability to correct some errors without requiring retransmission(s). In Type II hybrid-ARQ schemes, unsuccessful transmissions are used along with the latest packet received to improve decoding and error detection.

Code combining (CC) ARQ is classified as a Type II hybrid-ARQ scheme. Using CC-ARQ, the same information packet is sent during successive re-transmissions, and maximal ratio combining (MRC) is applied at the receiver to combine the received copies before decoding. The modulated symbols used in the successive transmission remain the same as in the first transmission, which is required for the combining operation.

The integration of a modulation process with the ARQ operation was subsequently proposed to utilize the memory of the successive transmissions and to increase Euclidean distances among the codewords by changing the constellation from one transmission to another. In this regard, manipulation of the mapping rules from bits to signal constellation points over re-transmissions can significantly enhance the performance of this hybrid-ARQ scheme. Based on the observation that different protection levels are offered to different bits in a higher order modulation scheme, the constellation rearrangement (CoRe) scheme was proposed. The CoRe scheme averages the reliability of different bits for 16-QAM (Quadrature Amplitude Modulation) over successive transmissions by swapping the position and/or negation of the least significant bits (LSB), as shown in Table I.

TABLE I

| 16-QAM CONSTELLATION REARRANGEMENT | | |
|---|---|---|
| Transmission i | Bit Seq. $P_i$ (m) | Operation |
| 1 | $i_1 q_1 i_2 q_2$ | Gray-encoded mapping |
| 2 | $i_2 q_2 i_1 q_1$ | Circ. shift of 2 and inv. of $i_1 q_1$ |
| 3 | $i_2 q_2 i_1 q_1$ | Circular shift of 2 |
| 4 | $i_1 q_1 i_2 q_2$ | Inversion of $i_2 q_2$ |
| 5, 6, . . . | — | Repeat 1-4 |

CoRe-ARQ has been adopted in the high speed down link packet access (HSDPA) transmission mode of the universal mobile telecommunications systems (UMTS) and in Institute of Electrical and Electronics Engineers (IEEE) 802.16m standard.

Despite the improvements provided by ARQ, hybrid-ARQ, and the more specific CC-ARQ and CoRe-ARQ, the rapidly growing reliance on wireless communication provides a need for further increasing the resilience and throughput of communication channel transmissions.

BRIEF SUMMARY

Embodiments described herein illustrate a new hybrid-ARQ scheme that provides improved BER and throughput when compared to CC-ARQ and CoRe-ARQ schemes, while maintaining a similar decoding complexity. This new hybrid-ARQ scheme is based on the construction of a code book of vectors, and in some embodiments, the code book may be constructed using linear constellation precoding (LCP). The new hybrid-ARQ scheme involves selection of a distinct vector for every $B = \log_2 M$ input information bits. The elements of the selected vector are transmitted one by one if a NACK is received from the destination. If an ACK is received, the source selects a new vector from the code book for transmission of another B input bits. As demonstrated by extensive analytical investigation and simulation, the packet error rate performance of this new hybrid-ARQ is better than the packet error rate performance of the CC-ARQ and CoRe-ARQ schemes over all SNR ranges. The new hybrid-ARQ scheme also demonstrates better throughput rate than CC-ARQ and CoRe-ARQ schemes for low to midrange SNR values.

In a first example embodiment of a transmitting device, a communication device is provided. The communication device includes processing circuitry configured to identify a first subset of information bits from a set of information bits to be transmitted, and select a first vector based on the first subset of information bits, wherein the first vector has a series of elements. The processing circuitry is further configured to transmit a first element of the first vector and receive an acknowledgment (ACK) or a negative acknowledgment (NACK) in response to transmitting the first element of the first vector. The processing circuitry is further configured to, in response to receiving a NACK, transmit a second element of the first vector. In some embodiments, this functionally exists within the context of a hybrid-ARQ scheme implemented by the communication device. In some embodiments, the communication device may be a mobile device.

In some embodiments, the processing circuitry is further configured to, in response to receiving a NACK after transmission of the second element of the first vector, transmit a third element of the first vector. Moreover, transmitting the second element of the first vector may include determining whether a maximum number of transmission attempts has been reached, and then transmitting the second element of the first vector in response to determining that the maximum number of transmission attempts has not been reached. In this regard, the processing circuitry may be configured to repeat the steps of (1) receiving a NACK in response to transmitting an element of the first vector; and (2), in response to receiving the NACK, transmitting the subsequent element of the first vector, with these steps repeating until the processing circuitry either receives an ACK in response to transmission of an element of the first vector, or determines that a maximum number of transmission attempts has been reached. The processing circuitry may be further configured to allow retransmission of elements of the first vector in an instance in which the number of elements in the first vector is less than the maximum number of transmission attempts.

In response to receiving an acknowledgement (ACK), the processing circuitry may be further configured to identify a second subset of information bits from the set of information bits, select a second vector based on a second subset of information bits, wherein the second vector has a series of elements, and transmit a first element of the second vector. In similar fashion as described above with respect to the first element of the first vector, the processing circuitry may be configured to transmit a second element of the second vector in response to receiving a NACK.

In some embodiments, the processing circuitry is further configured to construct a code book, wherein the code book includes the first vector. In this regard, the processing circuitry may be configured to select the first vector by using the first set of information bits as an index of the code book. The processing circuitry may be configured to construct the code book using linear constellation precoding. Alternatively, the processing circuitry may be configured to construct the code book by collecting a set of all possible arbitrary symbols and running numerical optimization techniques to minimize the average BER under various communication channel conditions. In any event, the code book may have M vectors, and each of the M vectors may have a length L. In some embodiments, each element of each vector of the code book is constructed using symbols from an N-point constellation, and the first subset of information bits includes B information bits. In such embodiments, N may be less than M, and M may equal $2^B$. Moreover, the length L of each vector of the code book may equal $\log_N M$.

In another example embodiment of a transmitting device, a method is provided. The method includes identifying, by the transmitting device, a first subset of information bits from a set of information bits to be transmitted, and selecting, by the transmitting device, a first vector based on the first subset of information bits, wherein the first vector has a series of elements. The method may further include transmitting, by the transmitting device, a first element of the first vector, and receiving a NACK in response to transmitting the first element of the first vector. The method further includes, in response to receiving the NACK, transmitting, by the transmitting device, a second element of the first vector.

In yet another example embodiment of a transmitting device, a non-transitory computer-readable storage medium is provided. The non-transitory computer-readable storage medium stores computer program instructions that, when executed by a processor, cause a communication device to identify a first subset of information bits from a set of information bits to be transmitted, and select a first vector based on the first subset of information bits, wherein the first vector has a series of elements. The computer program instructions, when executed by the processor, further cause the communication device to transmit a first element of the first vector and receive a NACK in response to transmitting the first element of the first vector. The computer program instructions, when executed by the processor, further causes the communication device to, in response to receiving the NACK, transmit a second element of the first vector. In some embodiments, this functionally exists within the context of a hybrid automatic repeat request (ARQ) scheme implemented by the communication device. In some embodiments, the communication device may be a mobile device.

In an example embodiment of a receiving device, a communication device is provided. The communication device includes processing circuitry configured to receive an element of a vector, wherein the vector is selected based on a subset of information bits from a set of information, wherein the vector has a series of elements, and attempt to decode the vector based on the received element, wherein the subset of information bits comprises an index of the vector in a code book. In an instance in which the communication device is unable to decode the vector, the processing circuitry is configured to transmit a NACK, and receive a subsequent element of the vector. In an instance in which the communication device is able to decode the vector, the processing circuitry is configured to transmit an ACK. In some embodiments, decoding the vector includes applying a maximum likelihood principle utilizing all received elements of the vector. In some embodiments, the communication device may be a mobile device.

In another example embodiment of a receiving device, a method is provided. The method includes receiving, by a communication device, an element of a vector, wherein the vector is selected based on a subset of information bits from a set of information, wherein the vector has a series of elements, and attempting to decode the vector based on the received element, wherein the subset of information bits comprises an index of the vector in a code book. In an instance in which the communication device is unable to decode the vector, the method includes transmitting, by the communication device, a NACK, and receiving, by the communication device, a subsequent element of the vector. In an instance in which the communication device is able to decode the vector, the method includes transmitting, by the receiving device, an ACK. In some embodiments, decoding the vector includes applying a maximum likelihood principle utilizing all received elements of the vector. In some embodiments, the communication device may be a mobile device.

In yet another example embodiment of a receiving device, a non-transitory computer-readable storage medium is provided. The non-transitory computer-readable storage medium stores computer program instructions that, when executed by a processor, cause a communication device to receive an element of a vector, wherein the vector is selected based on a subset of information bits from a set of information, wherein the vector has a series of elements, and attempt to decode the vector based on the received element, wherein the subset of information bits comprises an index of the vector in a code book. In an instance in which the communication device is unable to decode the vector, the computer program instructions, when executed by the processor, cause the communication device to transmit a NACK, and receive a subsequent element of the vector. In an instance in which the communication device is able to decode the vector, the computer program instructions, when executed by the processor, cause the communication device to transmit an ACK. In some embodiments, decoding the vector includes applying a maximum likelihood principle utilizing all received elements of the vector. In some embodiments, the communication device may be a mobile device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
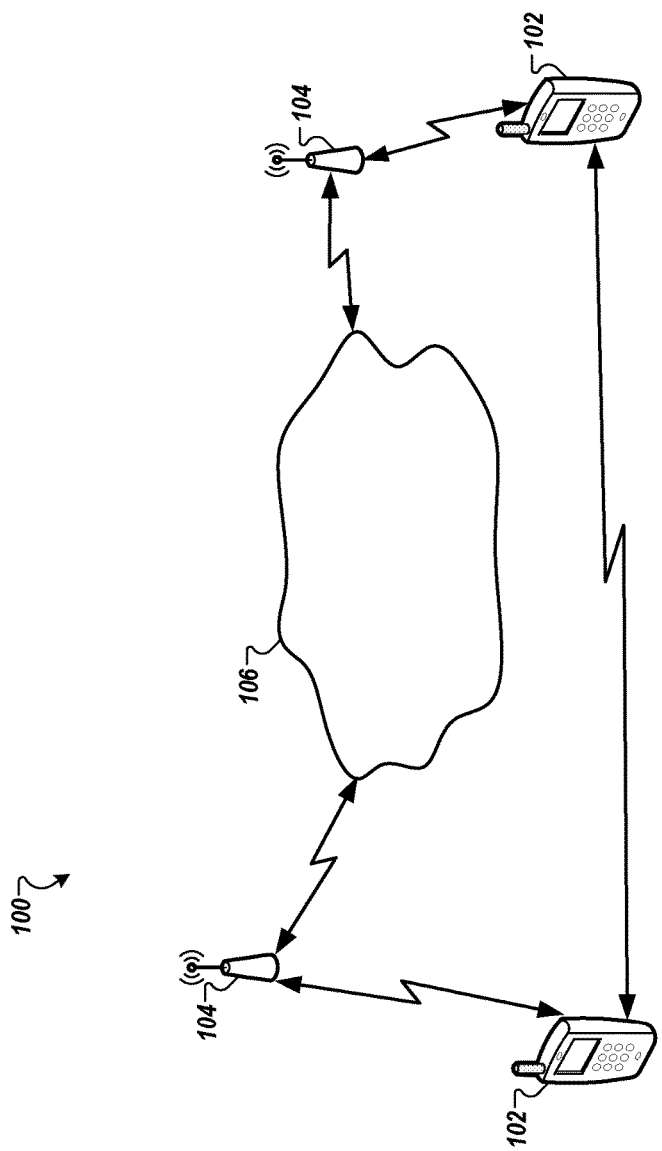
Figure 2:
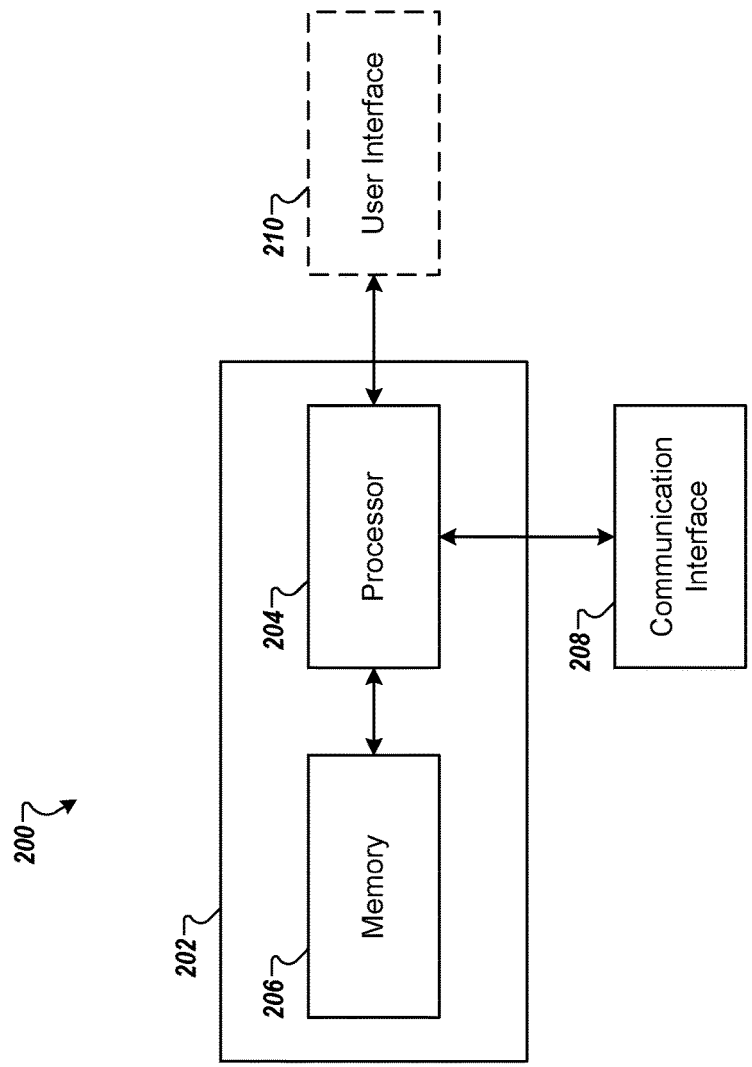
Figure 3:
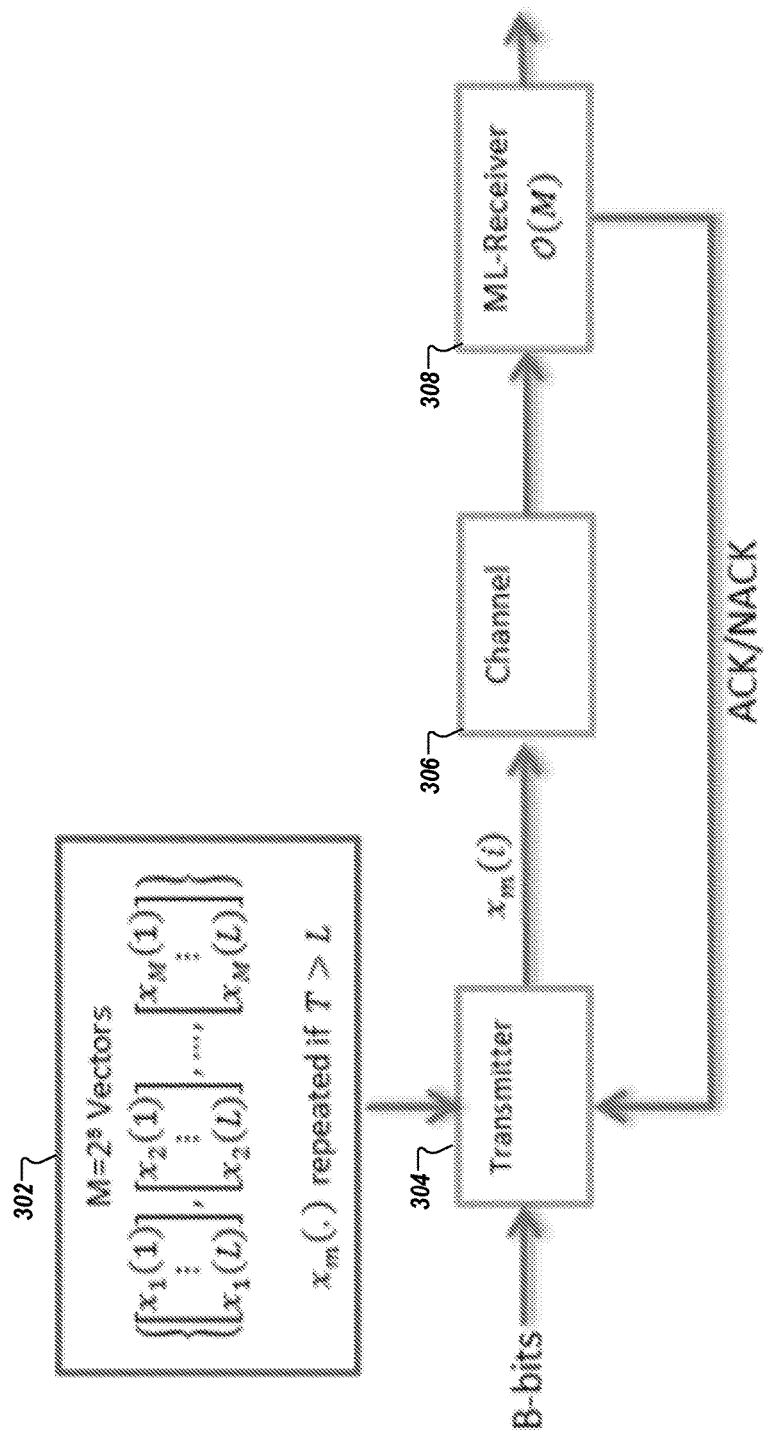
Figure 4:
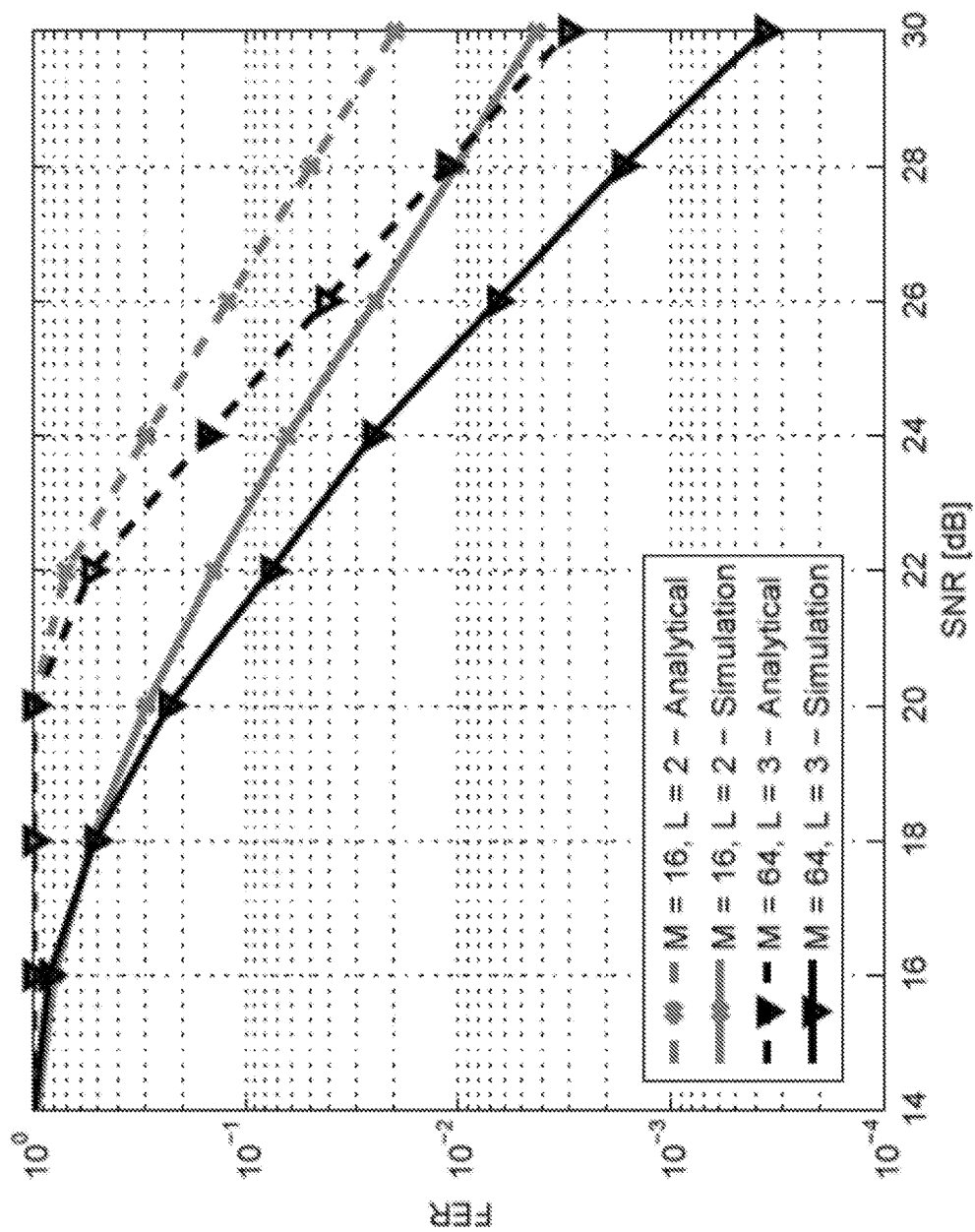
Figure 5A:
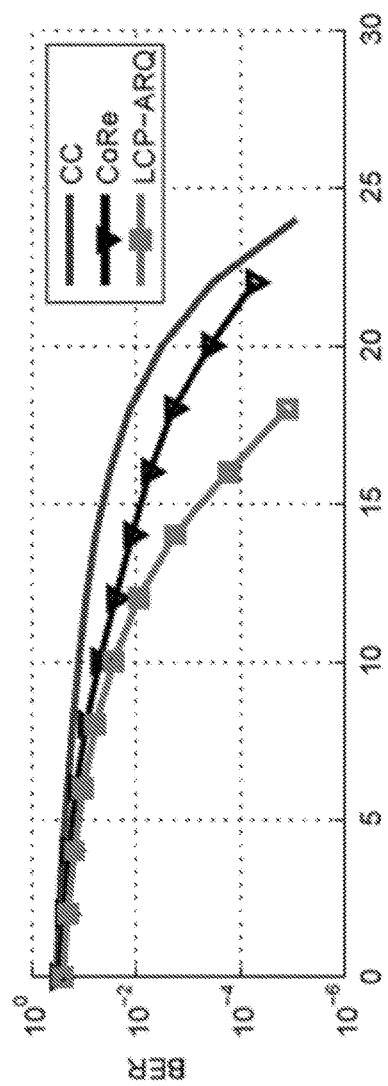
Figure 5B:
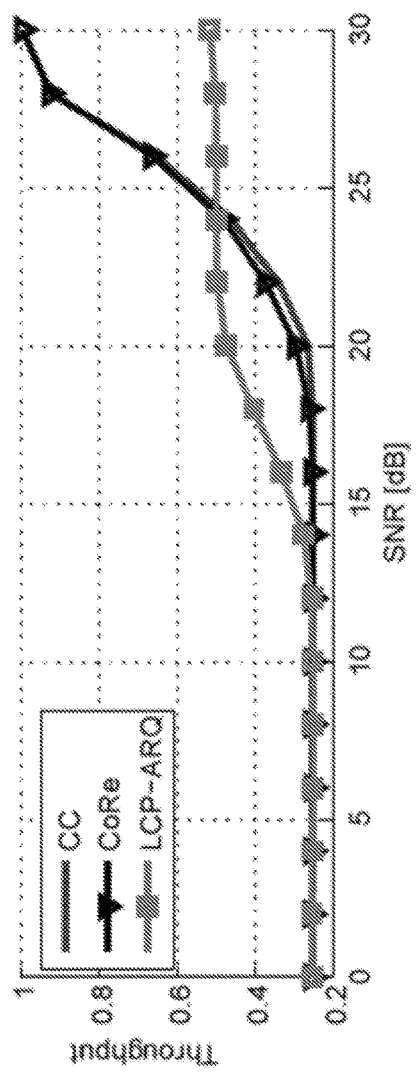
Figure 7:
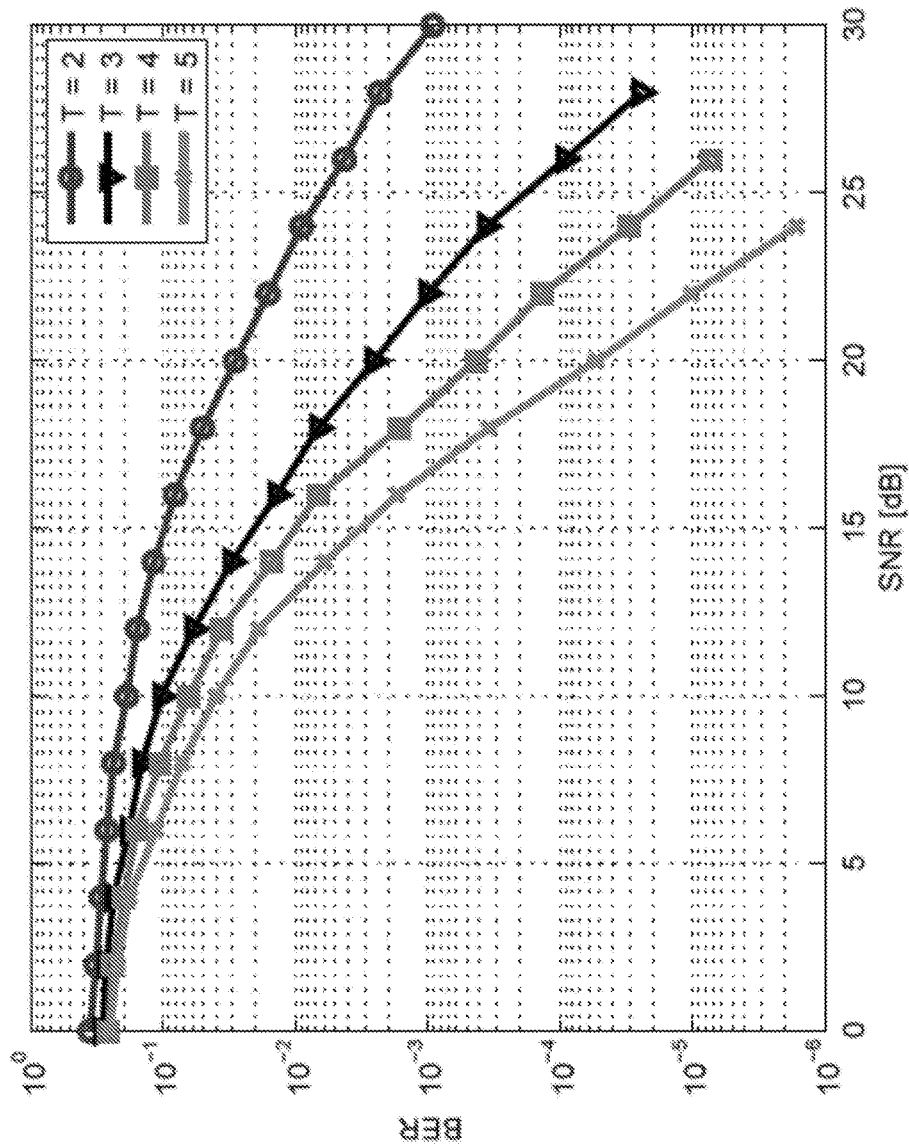
Figure 8:
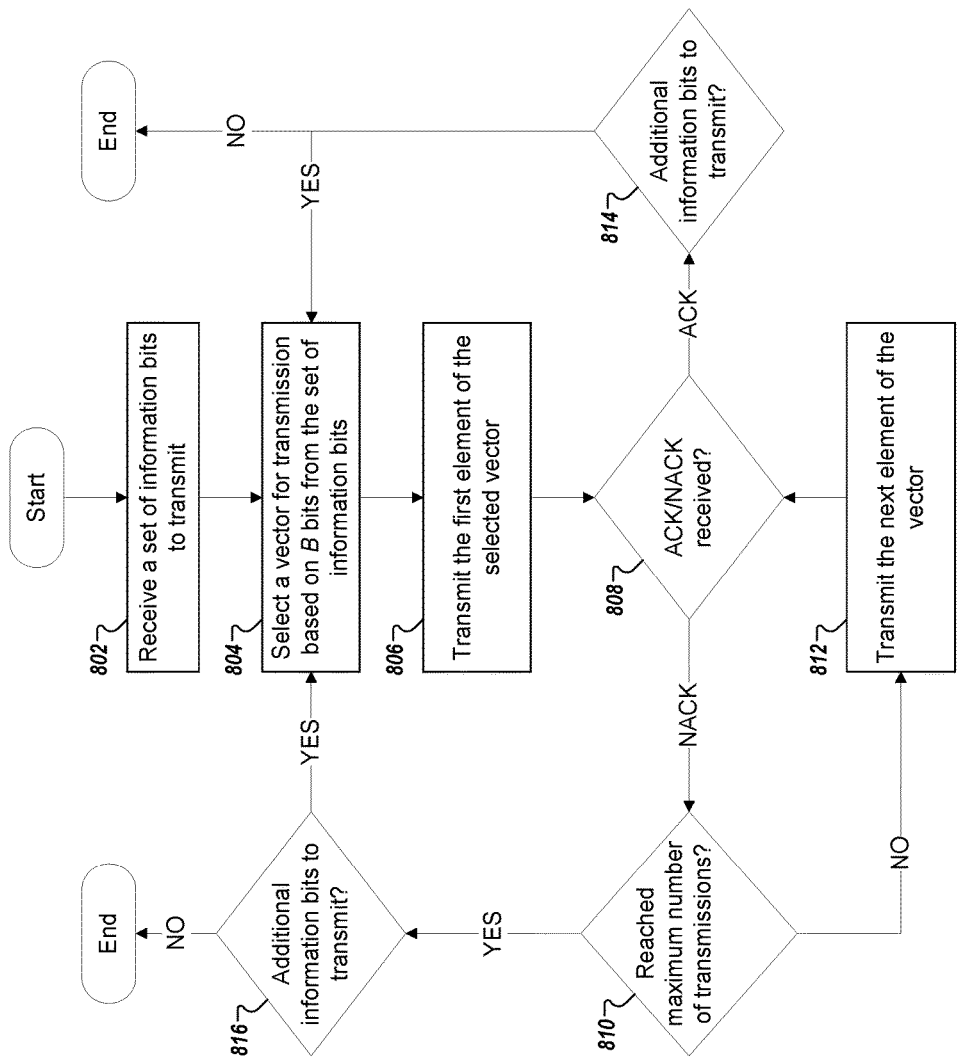
Figure 9:
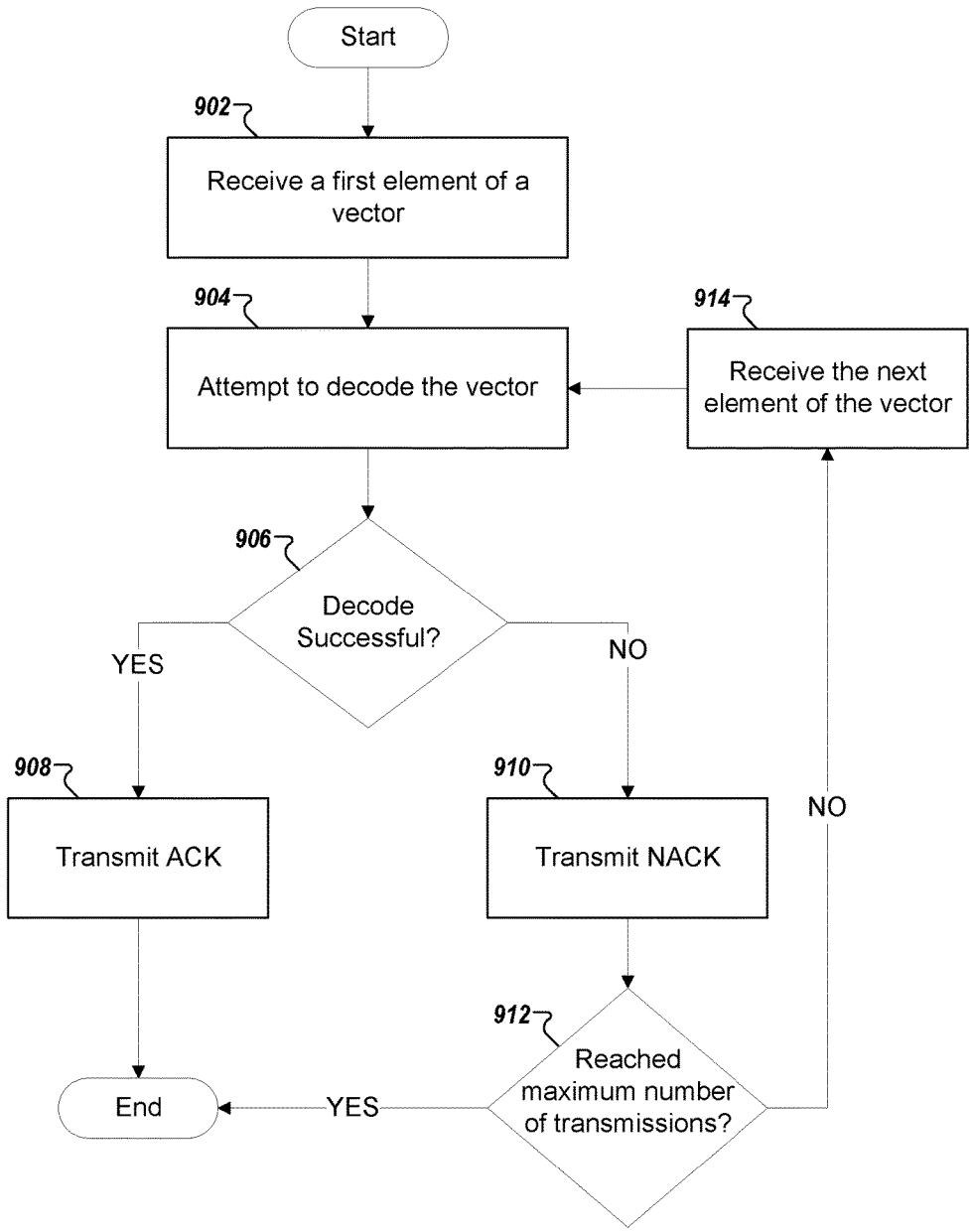

Having thus described certain example embodiments of the present disclosure in general terms, reference will now be made to the accompanying drawings, which are not necessarily drawn to scale, and wherein:

FIG. 1 is a schematic representation of an example communication environment that may benefit from embodiments of the present invention;

FIG. 2 is a block diagram of an apparatus that may be embodied by a communication device and/or an access point, in accordance with some example embodiments of the present invention;

FIG. 3 illustrates an overview of a new hybrid-ARQ scheme utilized by a transmitter and a receiver, in accordance with some example embodiments of the present invention;

FIG. 4 illustrates a graphical comparison of analytical and simulation results of FER for different values of M and L with an assumption that T=L, in accordance with some example embodiments of the present invention;

FIGS. 5A and 5B illustrates comparisons of CC-ARQ and CoRe-ARQ schemes to example embodiments of the new hybrid-ARQ scheme over an additive white Gaussian noise fading channel;

FIGS. 6A and 6B illustrate a BER comparison of CC-ARQ and CoRe-ARQ schemes to example embodiments of the new hybrid-ARQ scheme over Rayleigh fading channels;

FIG. 7 illustrates a graphical comparison of the effects of different numbers of allowable transmissions T on the BER of example embodiments of the new hybrid-ARQ scheme;

FIG. 8 illustrates a flow chart including example operations performed by a hybrid-ARQ transmitter, in accordance with some example embodiments of the present invention; and FIG. 9 illustrates a flow chart including example operations performed by a hybrid-ARQ receiver, in accordance with some example embodiments of the present invention.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. Note that in the equations provided below, $(\cdot)^T$ and $(\cdot)^H$ denote transpose and Hermitian transpose operations, respectively.

As described above, embodiments of the present invention utilize a new hybrid-ARQ scheme that provides an improved BER and throughput rate when compared to existing ARQ, CC-ARQ, and CoRe-ARQ schemes, while maintaining a similar decoding complexity. The new hybrid-ARQ scheme involves the construction of a code book of M vectors, and in some embodiments, the code book may be constructed using LCP. A distinct vector is chosen from this code book for every $B = \log_2 M$ input information bits. The elements of the selected vector are transmitted one by one if a NACK is received from the destination. If an ACK is received, the source selects a new vector from the code book and uses the new vector to transmit another B input bits. As demonstrated by extensive analytical and simulation investigation, the packet error rate performance of this new hybrid-ARQ scheme is better than the packet error rate performance of the CC-ARQ and CoRe-ARQ schemes over all SNR ranges. The new hybrid-ARQ scheme also demonstrates better throughput rate than CC-ARQ and CoRe-ARQ schemes for low to midrange SNR values.

It should be understood that while some embodiments contemplate construction of the code book using LCP, other embodiments contemplate other methods of constructing a code book. For instance, the code book may be constructed by collecting a set of all possible arbitrary symbols and running numerical optimization techniques to minimize the average BER under various communication channel conditions. The code book vectors can then be generated using the subset of symbols that demonstrated the best BER results.

System Diagram

FIG. 1 shows a system 100 having multiple communication channels between several devices within a networked environment. In system 100, a first communication device 102 may communicate with an access point 104 that is connected to a network 106, the first communication device 102 may communicate with another communication device 102 via this access point 104 and network 106, or the first communication device 102 may communicate directly with another communication device 102 (although embodiments contemplated herein require only a single communication channel between two devices). While illustrated at a high level, the network 106 may include a collection of various different nodes, devices or functions that may be in communication with each other via corresponding wired and/or wireless interfaces. For example, the network may include one or more cells (including access points 104) that serve a respective coverage area. The access points 104 could be, for example, part of one or more cellular or mobile networks or public land mobile networks (PLMNs). In turn, the communication devices 102 may be coupled via the network 106. Although the communication channels between communication devices 102 and respective access points 104 are illustrated in FIG. 1 as wireless connections (e.g., free space channels, acoustic channels, molecular and nano-particle channels, or the like), in some embodiments one or more of these communication channels may be wired (e.g., the communication channel(s) may comprise at least one of metal wire, coaxial cable, fibre optic cable, or the like).

As illustrated in FIG. 1, the communication devices 102 (which may also be referred to as user equipment (UE), mobile terminals, or the like) may include respective antennas for transmitting and receiving signals in some embodiments. As described herein, the communication devices 102 and the access point 104 may take the form of a transmitter and/or receiver.

In example embodiments, each of the communication devices 102 may be a mobile communication device such as, for example, a mobile telephone, portable digital assistant (PDA), pager, laptop computer, switching station, or any of numerous other hand held or otherwise portable communication devices, or combinations of the foregoing. However, it should be understood that communication devices 102 need not be mobile, and in some embodiments at least one device employing the new hybrid-ARQ scheme need not be a mobile communication device at all, and may instead comprise a stationary communication device, such as a desktop computer, stationary server, or the like. However, it should be understood that any devices configured to transmit signals via a (wired or wireless) communication channel may benefit from use of the new hybrid-ARQ scheme disclosed herein.

Turning now to the hardware elements of the communication devices 102, it is contemplated that each communication device 102 may include one or more processors. This communication device 102 may also include communication circuitry and corresponding hardware/software that enables transmission of signals to the other communication devices and/or the network 106. When communicating with the network 106, regardless of the specific configuration of the communication device 102, the communication device 102 may communicate with the network via access point 104 (which may be, for example, a base station, a relay node, or the like).

Each of the communication devices 102 and access points 104 may embody or otherwise be associated with an apparatus 200, as generally depicted in FIG. 2, which may be configured to perform various operations in accordance with example embodiments of the present invention described below, such as in conjunction with FIG. 8 from the perspective of a device transmitting a signal (a transmitter), and FIG. 9 from the perspective of a device receiving a signal (a receiver). It should be noted that the components, devices, and elements described below may not be mandatory in every embodiment of the present invention, and some may be omitted in certain embodiments. Additionally, some embodiments may include further or different components, devices or elements beyond those shown and described herein.

Turning now to FIG. 2, the apparatus 200 may include or otherwise be in communication with a processing system including, for example, processing circuitry 202 that is configurable to perform actions in accordance with example embodiments described herein. The processing circuitry 202 may be configured to perform data processing, application execution and/or other processing and management services according to an example embodiment of the present invention. In some embodiments, the apparatus 200 or the processing circuitry 202 may be embodied as a chip or chip set. In other words, the apparatus 200 or the processing circuitry 202 may comprise one or more physical packages (e.g., chips) including materials, components and/or wires on a structural assembly (e.g., a baseboard). The apparatus 200 or the processing circuitry 202 may, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 202 may include a processor 204 and memory 206 that may be in communication with or otherwise control a communication interface 208 and, in some cases, a user interface 210. As such, the processing circuitry 202 may be embodied as a circuit chip (e.g., an integrated circuit chip) configured (e.g., with hardware or a combination of hardware and software) to perform operations described herein. In some embodiments, the processing circuitry 202 may be embodied as a portion of a communication device 102, or as a portion of an access point 104.

The user interface 210 (if implemented) may be in communication with the processing circuitry 202 and may receive an indication of user input and/or to provide an audible, visual, mechanical or other output to the user. As such, the user interface 210 may include, for example, a keyboard, a mouse, a joystick, a display, a touch screen, a microphone, a speaker, or other input/output mechanisms. The apparatus 200 need not always include a user interface 210. For example, in instances in which the apparatus is embodied as an access point 104, a user interface 210 may not be necessary. As such, the user interface 210 is shown in dashed lines in FIG. 2.

The communication interface 208 may include one or more interface mechanisms for enabling communication with other devices and/or networks. In some cases, the communication interface may be any means such as a device or circuitry embodied in either hardware, or a combination of hardware and software that is configured to receive and/or transmit data from/to any other device or module in communication with the processing circuitry 202, such as between the communication devices 102, or between a communication device 102 and an access point 104. In this regard, the communication interface may include, for example, an antenna (or multiple antennas) and may support hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 206 may include one or more non-transitory memory devices such as, for example, volatile and/or non-volatile memory that may be either fixed or removable. The memory 206 may be configured to store information, data, applications, instructions or the like for enabling the apparatus 200 to carry out various functions in accordance with example embodiments of the present invention. For example, the memory 206 could be configured to buffer input data for processing by the processor 204. Additionally or alternatively, the memory 206 could be configured to store instructions for execution by the processor 204. As yet another alternative, the memory 206 may include one of a plurality of databases that may store a variety of files, contents or data sets. Among the contents of the memory 206, applications may be stored for execution by the processor 204 in order to carry out the functionality associated with each respective application. In some cases, the memory 206 may be in communication with the processor 204 via a bus for passing information among components of the apparatus 200.

The processor 204 may be embodied in a number of different ways. For example, the processor 204 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 204 may be configured to execute instructions stored in the memory 206 or otherwise accessible to the processor 204. As such, whether configured by hardware or by a combination of hardware and software, the processor 204 may represent an entity (e.g., physically embodied in circuitry—in the form of processing circuitry) capable of performing operations according to embodiments of the present invention while configured accordingly. Thus, for example, when the processor 204 is embodied as an ASIC, FPGA or the like, the processor may be specifically configured hardware for conducting the operations described herein. Alternatively, as another example, when the processor 204 is embodied as an executor of software instructions, the instructions may specifically configure the processor 204 to perform the operations described herein.

Context for Implementing the New Hybrid-ARQ Scheme

Embodiments described herein contemplate a communication link between a source S (such as a communication device 102 or an access point 104) and a destination D (which may comprise a communication device 102 or, if the source is a communication device 102, the destination D may comprise an access point 104). The destination D sends ACK or NACK feedback depending on the success or the failure of each packet transmission from the source S. Furthermore, it is assumed that overhead bits (e.g., ED bits, such as a CRC code) are attached to each packet to detect transmission failure. In response to receiving an ACK, the source S transmits a new packet, while in response to receiving a NACK, the source S re-transmits the current packet. Retransmission is continued until either an ACK is received from the destination D or a maximum allowed number of re-transmissions T is reached.

The communication channel connecting the source S and the destination D is assumed to be a Rayleigh fading channel (having complex channel gain $h \sim CN(0,1)$). The channel is also corrupted by additive white Gaussian noise (AWGN) with zero mean and variance $N_0$. Moreover, the channel is modeled as a block fading channel, where channel coefficient h remains constant during the transmission of each packet, but varies independently from one transmission/retransmission to another.

The New Hybrid-ARQ Scheme

Turning now to FIG. 3, the new hybrid-ARQ scheme will be described in greater detail. As a preliminary matter it should be noted that, in contrast with CC-ARQ, the new hybrid-ARQ scheme assigns different modulated symbols to the same information bits during retransmissions of the information bits. Moreover, unlike CoRe-ARQ, these modulated symbols are designed without changing the constellation mapping scheme. As a result, the new hybrid-ARQ scheme can transmit B bits using symbols from an N-point constellation, where N<M and $M=2^B$, by constructing vectors of L symbols, where $L=\log_N M$. In contrast, it should be noted that the CoRe-ARQ scheme requires a modulation scheme having an M-point constellation. Unlike both CC-ARQ and CoRe-ARQ, the new hybrid-ARQ scheme maps bits to symbol vectors, rather than just to individual symbols, which provides the basis for its improved performance relative to these existing ARQ schemes.

Specifically, the new hybrid-ARQ scheme operates as follows. Let $S=\{s_m\}_{m=1}^M$ be the set of all possible vectors of length L with components taken from a conventional N-point QAM constellation. This set S can be transformed into the set $X=\{x_m\}_{m=1}^M$. In some embodiments, the transformation may utilize a linear constellation precoding matrix $\Theta$ by setting $x_m=\Theta s_m$. See item 302 of FIG. 3. As such, B information bits can be mapped to a particular vector $x_m$. Table II summarizes different combinations of L and N values used to construct a set of 16 and 64 $x_m$ vectors.

TABLE II

| VALUES OF N AND L | | |
|---|---|---|
| Target M | N-point constellation | Vector Length L |
| 16 | BPSK | 4 |
|  | 4-QAM/QPSK | 2 |
| 64 | BPSK | 6 |
|  | 4-QAM/QPSK | 3 |
|  | 8-QAM | 2 |

The optimal precoding matrix $\Theta$ can be found through exhaustive search. A generalized version of the precoding matrix $\Theta$ is $$\Theta = \frac{1}{\sqrt{M}} \begin{bmatrix} 1 & \alpha_0 & \alpha_0^2 & \cdots & \alpha_0^{L-1} \\ 1 & \alpha_1 & \alpha_1^2 & \cdots & \alpha_1^{L-1} \\ \vdots & & & \ddots & \vdots \\ 1 & \alpha_{L-1} & \alpha_{L-1}^2 & \cdots & \alpha_{L-1}^{L-1} \end{bmatrix},$$

$$\alpha_k = \exp\left(j\left(\frac{2\pi k}{L} + \frac{2\pi}{4L}\right)\right), k=0,\cdots,L-1.$$

One particular example precoding matrix $\Theta$ that can be used for L=2 is given by $$\Theta = \frac{1}{\overline{\Theta}} \begin{bmatrix} 1 & e^{-\pi i/4} \\ 1 & e^{-5\pi i/4} \end{bmatrix}, \quad (1)$$

where the normalization factor $\overline{\Theta}$ is inserted to ensure $Tr(\Theta\Theta^H)=2$. The transmitter 304 selects a vector $x_m$ for every B information bits and transmits, via communication channel 306, elements of the vector, denoted by $x_m(i)$, one by one until an ACK is received or all T transmission attempts have been exhausted. The vector may be repeated if L<T.

The signal received by the receiver 308 (designated as the ML-receiver 308 in FIG. 3, because receiver 308 will receive M vectors of length L) in the $i^{th}$ transmission is given by $$r_i = \sqrt{P_t} h_i x_m(i) + n_i, \quad (2)$$

where $P_t$ is the transmission power, $h_i$ is the channel gain during the $i^{th}$ transmission, and $n_i$ is the noise. Decoding at the destination at the end of the $i^{th}$ round is carried out based on maximum likelihood principle using received signals from all i rounds of (re)transmissions, i.e., $$\hat{m} = \operatorname{argmin}_{\forall m}\left\{\sum_{n=1}^{i} \|r_n - h_n x_m(n)\|^2\right\}. \quad (3)$$

New Hybrid-ARQ Performance Analysis

An approximate packet error rate expression is illustrated for the proposed scheme assuming an uncoded transmission. The received signal vector $r_i = [r_1\ r_2\ \ldots\ r_i]^T$ at the destination for a fast fading channel, after the i rounds are exhausted, is given by $$r_i = \sqrt{P_t} X_m(i) h + n, \quad (4)$$

where $h = [h_1\ h_2\ \ldots\ h_i]^T$ is the channel gain vector, n is an AWGN vector, and $X_m(i)$ is a diagonal matrix, given by $$X_m(i) = \begin{bmatrix} x_m(1) & 0 & 0 & 0 \\ 0 & x_m(2) & 0 & 0 \\ \vdots & \vdots & \vdots & \vdots \\ 0 & 0 & \ddots & 0 \\ 0 & 0 & \ldots & x_m(i) \end{bmatrix}.$$

The frame error rate (FER) of the new hybrid-ARQ scheme $P_f$ with maximum T transmissions is given by $$P_f(T) = 1 - Pr(\text{Correct reception}) \quad (5)$$
$$= 1 - \sum_{i=1}^{T} P_c(i),$$

where $P_c(i)$ is the probability of correct frame detection after the $i^{th}$ round and can be calculated, conditioned on the channel vector h, as $$P_c(i\,|\,h) = [1 - P_f(i|h)] \prod_{j=1}^{i-1} P_f(j|h) \quad (6)$$
$$= \prod_{j=1}^{i-1} P_f(j|h) - \prod_{j=1}^{i} P_f(j|h).$$

Using equation (6) in equation (5), we get $$P_f(T|h) = 1 - \sum_{i=1}^{T}\left[\prod_{j=1}^{i-1} P_f(j|h) - \prod_{j=i}^{i} P_f(j|h)\right] \quad (7)$$
$$= 1 - \prod_{j=1}^{0} P_f(j|h) + \prod_{j=1}^{T} P_f(j|h)$$
$$= \prod_{j=1}^{T} P_f(j|h).$$

In turn, it is possible to calculate the FER in the $i^{th}$ round $P_f(i|h)$. Assuming that each frame consist of K uncoded symbols, the FER in the $i^{th}$ round is $$P_f(i|h) = 1 - [1 - P_s(i|h)]^K \quad (8)$$
$$\approx K P_s(i|h),$$

where $P_s(i|h)$ is the probability of symbol detection error in the $i^{th}$ round. The symbol error probability is upper bounded as $$P_s(i|h) \leq \frac{1}{M} \sum_{m} \sum_{\overline{m}} PEP_i(m \to \overline{m}|h), \quad (9)$$

where $PEP_i(m \to \overline{m}|h)$ is the pairwise error probability (PEP) in the $i^{th}$ round and represents the probability of making an error when the $m^{th}$ vector is transmitted. The PEP is given by the Chernoff bound as $$PEP_i(m \to \overline{m}|h) \leq \frac{1}{2} e^{-\frac{P_t}{4N_0} d^2(X_m(i), X_{\overline{m}}(i)|h)}, \quad (10)$$

where $$d^2(X_m(i), X_{\overline{m}}(i)|h) = \|(X_m(i) - X_{\overline{m}}(i))h\|^2 \quad (11)$$
$$= \sum_{n=1}^{i} |(x_m(n) - x_{\overline{m}}(n))h_n|^2$$
$$= \sum_{n=1}^{i} |e_{m,\overline{m}}(n)|^2 |h_n|^2.$$

Letting $$\gamma_n^{m,\overline{m}} = \frac{P_t}{4N_0} |e_{m,\overline{m}}(n)|^2$$

and using equation (10), we have $$PEP_i(m \to \overline{m}|h) \leq \frac{1}{2} e^{-\sum_{n=1}^{i} \gamma_n^{m,\overline{m}} |h_n|^2}. \quad (12)$$

The conditional FER in equation (7) can be re-written using equation (8), equation (9) and equation (12) as $$P_f(T|h) \approx \prod_{i=1}^{T} K\left[\frac{1}{M} \sum_{m_i} \sum_{\overline{m}_i} \frac{1}{2} e^{-\sum_{n=1}^{i} \gamma_n^{m_i, \overline{m}_i} |h_n|^2}\right] \quad (13)$$
$$= \left(\frac{K}{2M}\right)^T \sum_{m_i} \sum_{\overline{m}_i} \cdots \sum_{m_T} \sum_{\overline{m}_T}\left[\prod_{n=1}^{T} e^{-\left(\sum_{i=1}^{T-n+1} \gamma_n^{m_i, \overline{m}_i}\right) |h_n|^2}\right].$$

Finally, the unconditional FER is calculated by taking the expectation of equation (13) over $h_n$'s as $$P_f(T) \approx \left(\frac{K}{2M}\right)^T \sum_{m_i} \sum_{\overline{m}_i} \cdots \sum_{m_T} \sum_{\overline{m}_T} \left[ \prod_{n=1}^{T} \frac{1}{1 + \sum_{i=1}^{T-n+1} \gamma_n^{m_i, \overline{m}_i}} \right]. \quad (14)$$

Numerical Results

Turning now to FIGS. 4 through 7, simulation results verify this analysis and illustrate the performance of this new hybrid-ARQ scheme. FIG. 4 illustrates a graphical comparison of analytical and simulation results of FER for different values of M and L with an assumption that T=L. These analytical results provide a good estimate of the diversity order of the new hybrid-ARQ scheme. To compare the performance of the proposed scheme with conventional CC and CoRe ARQ schemes, these illustrations are compared to 16-QAM and 64-QAM constellation arrangements given by Wengerter et al. "Advanced hybrid ARQ technique employing a signal constellation rearrangement," *Proc. Of IEEE 56th Vehicular Technology Conference (VTC 2002-Fall)*, September 2002, pp. 2002-2006 and Panasonic "Enhanced HARQ method with signal constellation rearrangement," in *TSG-RAN Working Group 1 Meeting*, Las Vegas, USA, February 2001. It is also assumed that the signals comprise uncoded transmission over both AWGN (wired) and Rayleigh fading (wireless) channels. FIG. 4 illustrates a BER comparison of CC-ARQ and CoRe-ARQ schemes to an LCP-ARQ scheme over an additive white Gaussian noise fading channel when L=3, T=4, and M=64. As shown in FIG. 5A, the new hybrid-ARQ scheme outperforms the CC and CoRe schemes by 6.5 dB and 4.2 dB, respectively, at a target BER of $10^{-3}$. In FIG. 5B, which illustrates the results of a throughput efficiency comparison, the new hybrid-ARQ scheme demonstrates better throughput than both CC-ARQ and CoRe-ARQ schemes for a SNR range of 0-24 dB.

FIG. 6A illustrates a BER comparison of CC-ARQ and CoRe-ARQ schemes to the new hybrid-ARQ scheme over Rayleigh fading channels. The new hybrid-ARQ scheme outperforms the CC-ARQ scheme by 5 dB, and outperforms the CoRe-ARQ scheme by 2.5 dB at a target BER of $10^{-3}$. FIG. 6B illustrates the results of a throughput efficiency comparison for Rayleigh fading channels. Again, the new hybrid-ARQ scheme demonstrates better throughput than CC-ARQ and CoRe-ARQ schemes for SNR range of 0-25 dB.

FIG. 7 illustrates a graphical comparison of the effects of different numbers of allowable transmissions T on the BER of the new hybrid-ARQ scheme. From FIG. 6, it should be appreciated that the diversity of the new hybrid-ARQ scheme increases with increasing value of T.

As detailed above, the new hybrid-ARQ scheme, which may use linear constellation precoding (LCP) to construct the transmission vectors, provides better BER and a better throughput rate than existing CC-ARQ and CoRe-ARQ schemes.

Operations Implementing the New Hybrid-ARQ Scheme

FIG. 8 illustrates a flowchart containing a series of operations performed by example embodiments described herein to implement the new hybrid-ARQ scheme. The operations shown in FIG. 8 are performed in an example embodiment by an apparatus 200 that may be embodied by or otherwise associated with a signal transmitter, such as communication device 102 or access point 104.

In operation 802, the apparatus 200 includes means, such as processing circuitry 202, communication interface 208, user interface 210, or the like, for receiving a set of information bits to transmit. In some embodiments, this set of information may be stored in memory 206, received from a user via user interface 210, received from a third party via communication interface 208, or any combination thereof.

After gathering the set of information bits for transmission, the apparatus 200 includes means, such as processing circuitry 202, communication interface 208, user interface 210, or the like, for identifying a first subset of information bits from the set of information bits. This first subset of information bits comprises B information bits that can be transmitted as detailed below in operations 804-812. It should be understood that while operations 804-812 are described with respect to the transmission of the first subset of information bits, these operations may be repeated for each subsequent set of B information bits until the entire set of information bits is transmitted (or, for each subset of B information bits, until a maximum number of transmission attempts has been reached).

Turning to operation 804, the apparatus 200 includes means, such as processing circuitry 202 or the like, for selecting a first vector based on the first subset of B information bits, wherein the first vector has a series of elements. To select the first vector, the first subset of B information bits may be used as the index to a code book. As such, the code book includes the first vector. In some embodiments, the processing circuitry 202 may be configured to construct the code book using linear constellation precoding. In other embodiments, the processing circuitry 202 may be configured to construct the code book by collecting a set of all possible arbitrary symbols and running numerical optimization techniques to minimize the average BER under various communication channel conditions.

In either case, the code book may have M vectors, and, in some embodiments, each of the M vectors has a length L. Each element of each vector of the code book may be constructed using symbols from an N-point constellation. To this end, in some embodiments, N is less than M and M equals $2^B$. Similarly, in some embodiments, a length L of each vector of the code book equals $\log_N M$.

In operation 806, the apparatus 200 includes means, such as processing circuitry 202, communication interface 208, or the like, for transmitting a first element of the selected vector.

Subsequently, in operation 808, the apparatus 200 may receive an acknowledgment (ACK) or negative acknowledgment (NACK) in response to transmitting the first element of the first vector. Failure to receive either an ACK or a NACK within a predetermined time period may trigger interpretation of this lack of a response as a NACK (or, in some alternate embodiments, as an ACK). After determining that a NACK is received, the procedure may optionally advance to operation 810, in which the apparatus 200 includes means, such as processing circuitry 202 or the like, for determining whether a maximum number of transmission attempts has been reached. If the maximum number of transmission attempts has not been reached (or in embodiments in which there is no maximum number of transmission attempts), the procedure advances to operation 812, in which the apparatus 200 includes means, such as processing circuitry 202, communication interface 208, or the like, for transmitting a second element of the first vector (or the next element of the vector, if the prior transmission was not a transmission of the first element of the first vector). The apparatus 200 may allow retransmission of elements of the first vector (e.g., once all elements of the first vector have been transmitted, if a NACK is still received, the procedure may circle back to the start of the vector and transmit the first element of the first vector, and then the second element of the first vector, and so forth), although retransmission of these elements would only occur in an instance in which the number of elements in the first vector is less than the maximum number of transmission attempts (or an instance in which there is no maximum number of transmission attempts).

The procedure then returns to operation 808 and waits for an ACK or a NACK. Accordingly, operations 808-812 may continue in a loop until either an ACK is received in operation 808 or until the maximum number of transmission attempts is reached in operation 810.

If, in operation 808, an ACK is received, the procedure advances to operation 814, in which the apparatus 200 includes means, such as processing circuitry 202 or the like, for determining whether there are additional information bits to transmit. In this regard, if all information bits of the original set of information bits have been transmitted previously, then the procedure ends. However, if the set of information bits still includes some information bits that have not yet been transmitted, then the procedure returns to operation 806 for the selection of a new vector to transmit an additional B bits.

If, in operation 810, the maximum number of transmission attempts for a particular vector has been reached, then the procedure advances to operation 816, which is identical to operation 814, and if additional information bits exist for transmission, the procedure returns to operation 806 for the selection of a new vector to transmit an additional B bits.

FIG. 9 illustrates a flowchart containing a series of operations performed by example embodiments described herein to implement the new hybrid-ARQ scheme. The operations shown in FIG. 9 are performed in an example embodiment by an apparatus 200 that may be embodied by or otherwise associated with a signal receiver, such as a communication device 102 or access point 104.

In operation 902, the apparatus 200 includes means, such as processing circuitry 202, communication interface 208, or the like, for receiving an element of a vector, wherein the vector has a series of elements. As described above in operation 804 above, the vector is selected by the transmitting device based on a subset of information bits from a set of information (e.g., the subset of bits is used as the index in a code book to select the vector).

In operation 904, the apparatus 200 includes means, such as processing circuitry 202 or the like, for attempting to decode the vector based on the received element. Decoding the vector may comprise a reversal of the operations performed to encode the subset of information bits (which are described above in connection with FIG. 8). In some embodiments, operation 904 may include applying a maximum likelihood principle utilizing all rounds of transmissions (e.g., by using all elements of the vector received so far). In this regard, the apparatus 200 includes means, such as processing circuitry 202 or the like, for assembling a partial/complete vector (e.g., $r_i$) by collecting the received symbol and the symbols received in all previously transmissions (e.g., $[r_1\ r_2\ \ldots\ r_i]$) and finding the closest matching vector in the code book. The subset of information bits comprises the index of this closest matching vector. However, it may not be possible to identify a single closest matching vector in the code book based on the rounds of transmissions that have been received. For instance, the elements of the vector received so far may not uniquely identify a specific vector in the code book, and there may remain ambiguity regarding which vector, of multiple vectors in the code book, corresponds to the received element.

In operation 906, it is determined whether the attempt to decode the vector is successful. If the attempt is successful and the apparatus 200 is able to decode the vector, the procedure advances to operation 908. In operation 908, the apparatus 200 includes means, such as communication interface 208 or the like, for transmitting an ACK, at which point the procedure ends (although the procedure may later begin anew upon receipt of an element from another vector). Alternatively, however, if the apparatus 200 is unable to identify a closest matching vector in the code book, the procedure advances to operation 910, in which the apparatus 200 includes means, such as communication interface 208 or the like, for transmitting an NACK.

From operation 910, the procedure may optionally advance to operation 912, in which the apparatus 200 includes means, such as processing circuitry 202 or the like, for determining whether a maximum number of transmission attempts has been reached. If the maximum number of transmission attempts has not been reached (or in embodiments in which there is no maximum number of transmission attempts), the procedure advances to operation 914, in which the apparatus 200 includes means, such as processing circuitry 202, communication interface 208, or the like, for receiving the next element of the vector. However, if the maximum number of transmission attempts has been reached, then the operation ends without successful receipt of the subset of information bits.

It should be understood that the operations illustrated in FIGS. 8 and 9 describe the sequential transmission of elements from a single vector at a time for ease of description. However, in many embodiments contemplated herein, a frame of information transmitted by a communication device can include elements from more than one vector. As one example, a single frame of information may include a series of K elements. In such cases, embodiments contemplated herein may transmit the first element of K separate vectors in that frame, wherein each vector is selected using different subset of B information bits as an index in the code book.

After receipt of the frame, the receiving device may attempt to decode each of the K vectors. The receiving device may determine that all, none, or some of these vectors can be decoded. If all of the vectors can be decoded, then the receiving device may send an ACK, in response to which the transmitting device may transmit a new frame including the first element of K new vectors. If none or only some of the vectors can be decoded, however, then the receiving device may send a NACK. In response to receiving this NACK, the transmitting device may send a new frame comprising the second element of each of the K vectors. If the receiving device is able to decode all K vectors based on the first and second elements of each vector, then the receiving device may transmit an ACK. Otherwise, the receiving device may transmit another NACK, prompting the transmitting device to send a frame containing the third element of each of the K vectors, and so forth. This process may repeat until the maximum number of transmissions is reached or all of the K vectors have been decoded by the receiving device.

The above-described flowcharts illustrate operations performed by communication devices 102 or access point 104 (which include hardware elements illustrated in apparatus 200 of FIG. 2), in accordance with some example embodiments of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 206 of the apparatus 200 employing an embodiment of the present invention and executed by a processor 204 of the apparatus 200. As will be appreciated, loading these computer program instructions onto an apparatus 200 produces a specially programmed apparatus configured to implement the functions specified in the respective flowchart blocks. The computer program instructions may also be stored in a non-transitory computer-readable storage medium that may direct a computer or other programmable apparatus to function in the prescribed manner, such that storing the instructions in the computer-readable storage memory produce an article of manufacture which can be accessed by an apparatus 200 to implement the functions specified in the flowchart blocks. Accordingly, the operations illustrated in the flowcharts define algorithms for configuring a computer or processing circuitry 202, e.g., processor, to perform example embodiments described above. When a general purpose computer stores the algorithms illustrated above, the general purpose computer is transformed into a particular machine configured to perform the corresponding functions.

Blocks of the flowcharts support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A communication device comprising processing circuitry configured to:
    identify a first subset of information bits B from a set of information bits to be transmitted;
    select a first vector $x_1(\cdot)$ based on the first subset of information bits B, wherein the first vector $x_1(\cdot)$ has a series of elements, and the first subset of information bits B is mapped to the first vector $x_1(\cdot)$;
    transmit a first element $x_1(1)$ of the first vector $x_1(\cdot)$;
    receive a negative acknowledgment (NACK) in response to transmitting the first element $x_1(1)$ of the first vector $x_1(\cdot)$; and
    in response to receiving the NACK, transmit a second element $x_1(2)$ of the first vector $x_1(\cdot)$.

2. The communication device of claim 1, wherein the processing circuitry is configured to implement a hybrid automatic repeat request (ARQ) scheme.

3. The communication device of claim 1, wherein the processing circuitry is configured to, in response to receiving a NACK in response to transmission of the second element of the first vector, transmit a third element of the first vector.

4. The communication device of claim 1, wherein transmitting the second element of the first vector comprises:
    determining whether a maximum number of transmission attempts has been reached, and
    transmitting the second element of the first vector in response to determining that the maximum number of transmission attempts has not been reached.

5. The communication device of claim 4, wherein the processing circuitry is configured to repeat the steps of receiving a NACK in response to transmitting an element of the first vector, and, in response to receiving the NACK, transmitting the subsequent element of the first vector until the processing circuitry:
    receives an ACK in response to transmission of an element of the first vector; or
    determines that a maximum number of transmission attempts has been reached.

6. The communication device of claim 5, wherein the processing circuitry is further configured to allow retransmission of elements of the first vector in an instance in which the number of elements in the first vector is less than the maximum number of transmission attempts.

7. The communication device of claim 1, wherein the processing circuitry is further configured to, in response to receiving an acknowledgement (ACK):
    identify a second subset of information bits from the set of information bits;
    select a second vector based on a second subset of information bits, wherein the second vector has a series of elements; and
    transmit a first element of the second vector; and
    in response to receiving a NACK, transmit a second element of the second vector.

8. The communication device of claim 1, wherein the processing circuitry is further configured to construct a code book, wherein the code book includes the first vector.

9. The communication device of claim 8, wherein the processing circuitry is configured to select the first vector by using the first set of information bits as an index of the code book.

10. The communication device of claim 8, wherein the processing circuitry is configured to construct the code book using linear constellation precoding.

11. The communication device of claim 8, wherein the processing circuitry is configured to construct the code book by collecting a set of all possible arbitrary symbols and running numerical optimization techniques to minimize the average BER under various communication channel conditions.

12. The communication device of claim 8, wherein the code book has M vectors.

13. The communication device of claim 12, wherein each of the M vectors has a length L.

14. The communication device of claim 13, wherein each element of each vector of the code book is constructed using symbols from an N-point constellation, and wherein the first subset of information bits includes B information bits.

15. The communication device of claim 14, wherein N is less than M.

16. The communication device of claim 14, wherein M equals $2^B$.

17. The communication device of claim 14, wherein a length L of each vector of the code book equals $\log_N M$.

18. A method comprising:
identifying, by a transmitting device, a first subset of information bits B from a set of information bits to be transmitted;
selecting, by the transmitting device, a first vector $x_1(\bullet)$ based on the first subset of information bits B, wherein the first vector $x_1(\bullet)$ has a series of elements, and the first subset of information bits B is mapped to the first vector $x_1(\bullet)$;
transmitting, by the transmitting device, a first element $x_1(1)$ of the first vector $x_1(\bullet)$;
receiving a negative acknowledgment (NACK) in response to transmitting the first element $x_1(\bullet)$ of the first vector $x_1(\bullet)$; and
in response to receiving the NACK, transmitting, by the transmitting device, a second element $x_1(2)$ of the first vector $x_1(\bullet)$.

19. A communication device comprising processing circuitry configured to:
receive an element $x_1(1)$ of a vector $x_1(\bullet)$, wherein the vector $x_1(\bullet)$ is selected based on a subset of information bits B from a set of information bits, wherein the vector $x_1(\bullet)$ has a series of elements and the subset of information bits B is mapped to the first vector $x_1(\bullet)$;
attempt to decode the vector $x_1(\bullet)$ based on the received element $x_1(1)$, wherein the subset of information bits B comprises an index of the vector $x_1(\bullet)$ in a code book;
in an instance in which the communication device is unable to decode the vector $x_1(\bullet)$,
transmit a NACK, and
receive a subsequent element $x_1(2)$ of the vector $x_1(\bullet)$; and
in an instance in which the communication device is able to decode the vector $x_1(\bullet)$, transmit an ACK.

20. The communication device of claim 19, wherein attempting to decode the vector includes applying a maximum likelihood principle utilizing all received elements of the vector.

* * * * *